(12) United States Patent
Arase et al.

(10) Patent No.: US 12,296,491 B2
(45) Date of Patent: May 13, 2025

(54) REMOTE CONTROLLED DEVICE, IMAGE DISPLAY DEVICE, AND VIDEO DISPLAY CONTROL METHOD

(71) Applicant: JVCKENWOOD CORPORATION, Yokohama (JP)

(72) Inventors: Takayuki Arase, Yokohama (JP); Shunichi Fujii, Yokohama (JP); Yuichi Arahata, Yokohama (JP); Satoshi Yoshimura, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 296 days.

(21) Appl. No.: 17/955,942

(22) Filed: Sep. 29, 2022

(65) Prior Publication Data

US 2023/0026805 A1 Jan. 26, 2023

Related U.S. Application Data

(63) Continuation of application No. PCT/JP2021/047019, filed on Dec. 20, 2021.

(30) Foreign Application Priority Data

Mar. 23, 2021 (JP) .................. 2021-048618

(51) Int. Cl.
*B25J 9/16* (2006.01)
*B25J 13/08* (2006.01)
(Continued)

(52) U.S. Cl.
CPC .............. *B25J 9/1689* (2013.01); *B25J 13/08* (2013.01); *G05D 1/0038* (2013.01);
(Continued)

(58) Field of Classification Search
CPC ....... B25J 9/1689; B25J 13/08; G05D 1/0038; G05D 1/0214; G09G 5/36; G09G 5/00;
(Continued)

(56) References Cited

U.S. PATENT DOCUMENTS

2017/0041544 A1  2/2017 Kobayashi
2017/0185152 A1* 6/2017 Keller .................. G06F 3/016
(Continued)

FOREIGN PATENT DOCUMENTS

JP  2011152593 A  8/2011
JP  2016502294 A  1/2016
(Continued)

OTHER PUBLICATIONS

Search Report issued on Aug. 26, 2024, for application No. EP21931963.9.

*Primary Examiner* — Sohana Tanju Khayer
(74) *Attorney, Agent, or Firm* — Nath, Goldberg & Meyer; Jerald L. Meyer

(57) ABSTRACT

When a controller controls a driver so as to move a moving unit in accordance with a user's movement, the controller controls a video signal processor such that frame videos of a video signal transmitted to an image display device have a first display mode. When the controller controls the driver so as to move the moving unit regardless of the user's movement, the controller controls the video signal processor such that frame videos of a video signal transmitted to the image display device have a second display mode.

12 Claims, 7 Drawing Sheets

(51) Int. Cl.
  *G02B 27/01*   (2006.01)
  *G05D 1/00*    (2006.01)
  *G09G 5/00*    (2006.01)
  *G09G 5/36*    (2006.01)
  *H04N 23/661*  (2023.01)
  *H04N 23/695*  (2023.01)
  *H04N 23/81*   (2023.01)
  *H04N 23/951*  (2023.01)

(52) U.S. Cl.
  CPC ............. *G05D 1/0214* (2013.01); *G09G 5/36* (2013.01); *H04N 23/661* (2023.01); *H04N 23/695* (2023.01); *H04N 23/81* (2023.01); *H04N 23/951* (2023.01)

(58) Field of Classification Search
  CPC .... H04N 23/661; H04N 23/695; H04N 23/81; H04N 23/951; H04N 7/18; G02B 27/017
  See application file for complete search history.

(56) References Cited

U.S. PATENT DOCUMENTS

| | | | |
|---|---|---|---|
| 2021/0037214 A1* | 2/2021 | Itoh | B25J 5/005 |
| 2021/0097707 A1* | 4/2021 | Oba | G08G 1/167 |
| 2023/0076335 A1* | 3/2023 | Nakakura | H04N 21/816 |
| 2023/0215015 A1* | 7/2023 | Yoshida | G06T 7/248 |
| | | | 382/100 |

FOREIGN PATENT DOCUMENTS

| | | | |
|---|---|---|---|
| JP | 6801136 B1 | 11/2021 | |
| WO | 2018032457 A1 | 2/2018 | |

\* cited by examiner

REMOTE CONTROLLED DEVICE, IMAGE DISPLAY DEVICE, AND VIDEO DISPLAY CONTROL METHOD

CROSS REFERENCE TO RELATED APPLICATION

This application is a Continuation of PCT Application No. PCT/JP2021/047019, filed on Dec. 20, 2021, and claims the priority of Japanese Patent Application No. 2021-048618, filed on Mar. 23, 2021, the entire contents of both of which are incorporated herein by reference.

BACKGROUND

The present disclosure relates to a remote controlled device, an image display device, and a video display control method.

As disclosed in Japanese Patent No. 6801136, a remote control system has been put into practical use in which a user wearing an image display device such as a head-mounted display controls a robot (a remote controlled device) present at a remote location. The technology used in this type of remote control system for controlling, in real time, the robot present at the remote location is called telexistence.

SUMMARY

A remote controlled device such as a robot is basically configured to move in accordance with the user's movements. However, in order to avoid a failure of the remote controlled device due to an object of some sort hitting the remote controlled device, for example, it is conceivable for the remote controlled device itself to take a risk-avoidance action. In this case, a video signal is captured by using a camera attached to the remote controlled device and is transmitted to an image display device worn by the user. Since the video signal moves rapidly regardless of the user's intension, the user may experience visually induced motion sickness and confusion.

A first aspect of one or more embodiments provides a remote controlled device including: a moving unit; a driver configured to drive the moving unit; a network communication unit configured to receive movement data indicating a movement of a user via a network and to transmit video data to an image display device worn by the user; a controller configured to control the driver so as to move the moving unit in accordance with the movement data; a camera attached to the moving unit; and a video signal processor configured to generate the video data based on a video signal captured by the camera, in which the controller controls the video signal processor such that when the controller controls the driver so as to move the moving unit in accordance with the movement data, the controller generates video data formed of a frame video having a first display mode, and when the controller controls the driver so as to move the moving unit regardless of the movement data, the controller generates video data formed of a frame video having a second display mode.

A second aspect of one or more embodiments provides an image display device including: a movement sensor configured to detect a movement of a user; a receiving unit configured to receive a video signal and additional data, the video signal being captured by a camera attached to a moving unit of a remote controlled device configured to move in accordance with movement data indicating the movement of the user detected by the movement sensor, and the additional data being for identifying a start and an end of a period during which the moving unit is rotated; and an image display unit configured to display the video signal received by the receiving unit, in which the additional data is superimposed on the video signal when the remote controlled device moves the moving unit regardless of the movement data, and when the additional data is not input, the image display unit displays the video signal received by the receiving unit as a frame video having a first display mode, and when the additional data is input, the image display unit displays the video signal received by the receiving unit as a frame video having a second display mode.

A third aspect of one or more embodiments provides a video display control method including: transmitting movement data indicating a movement of a user to a remote controlled device; moving a moving unit in accordance with the received movement data by means of the remote controlled device; transmitting a video signal captured by a camera attached to the moving unit to an image display device worn by the user by means of the remote controlled device; displaying the video signal transmitted from the remote controlled device by means of an image display unit of the image display device; displaying a video signal of which a first rate is a rate at which a frame video is updated by means of the image display unit when a controller of the remote controlled device moves the moving unit in accordance with the movement data; and when the controller moves the moving unit regardless of the movement of the user, transmitting a video signal formed of a frame video having a second display mode different from a first display mode, to the image display device by means of the remote controlled device, and displaying the video signal formed of the frame video having the second display mode by means of the image display unit, or transmitting a video signal formed of a frame video having the first display mode, to the image display device by means of the remote controlled device, and displaying a video signal formed of a frame video having the second display mode based on the frame video having the first display mode by means of the image display unit.

BRIEF DESCRIPTION OF THE DRAWINGS

FIG. 4 is a diagram illustrating an example of a video signal of 60 frames per second and a video signal having a frame video update rate of 20 frames per second.

FIG. 5 is a diagram illustrating an example of a video signal of 60 frames per second and a video signal having a frame video update rate of 20 frames per second and 10 frames per second.

DETAILED DESCRIPTION

Hereafter, a remote controlled device, an image display device, and a video display control method according to each embodiment will be described with reference to the accompanying drawings. First, a configuration example of a remote control system having the image display device and the remote controlled device will be explained with reference to FIG. 1.

Figure 1:
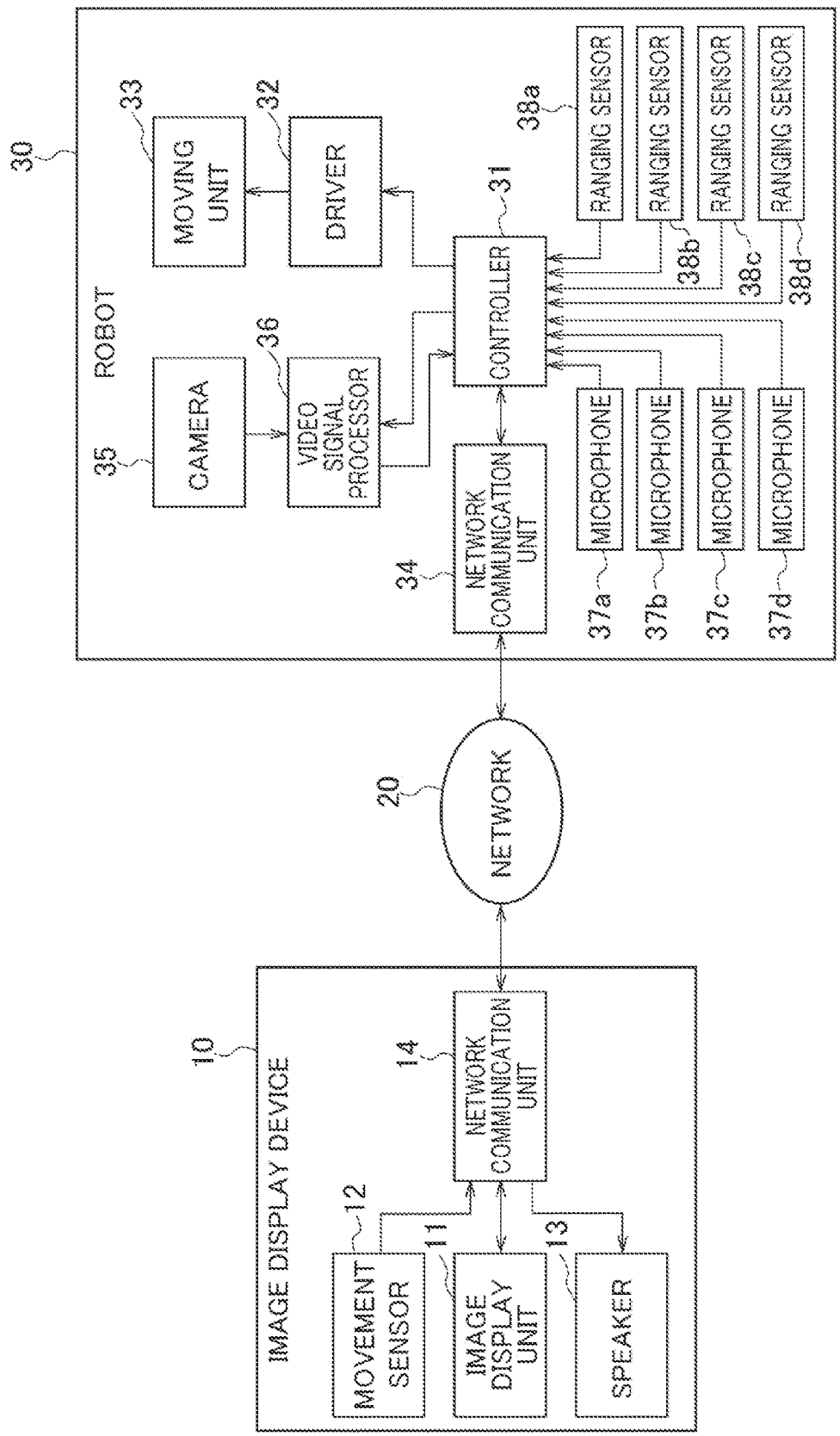
FIG. 1 is a block diagram illustrating a configuration example of a remote control system having an image display device according to a first or second embodiment and a remote controlled device according to a first or second embodiment.

In FIG. 1, an image display device 10 and a robot 30 are connected to each other via a network 20. The robot 30 is located at a remote location away from where the image display device 10 is located. The image display device 10 is a head-mounted display as an example. The robot 30 is an example of a remote controlled device of which the movement is controlled in accordance with movement data indicating the movement of the image display device 10 or a user wearing the image display device 10. The network 20 is typically the Internet.

The image display device 10 includes an image display unit 11, a movement sensor 12, a speaker 13, and a network communication unit 14. The movement sensor 12 includes an acceleration sensor and a gyro-sensor to detect acceleration and angular velocity indicating a change in rotation or orientation when the image display device 10 (that is, the user) moves. The speaker 13 includes headphones or earphones.

When the user wearing the image display device 10 moves, movement data indicating the user's movement detected by means of the movement sensor 12 is encoded. Then the encoded data is transmitted to the robot 30 via the network communication unit 14 and the network 20. The network communication unit 14 functions as a transmission unit.

The robot 30 includes a controller 31, a driver 32, a moving unit 33, a network communication unit 34, a camera 35, a video signal processor 36, microphones 37a to 37d, and ranging sensors 38a to 38d. The controller 31 can be formed of a microcomputer or a microprocessor.

After the network communication unit 34 receives the movement data transmitted from the image display device 10, the network communication unit 34 supplies the movement data to the controller 31. The network communication unit 34 functions as a receiving unit. The controller 31 decodes the encoded movement data and controls the driver 32 to move the moving unit 33 in accordance with the movement data. The moving unit 33 is constituted by the head, legs, and the like of the robot 30, for example. The driver 32 includes an actuator that is at least one of an electric motor, an electromagnetic solenoid, a hydraulic cylinder, and a pneumatic cylinder for rotating the head or moving the legs. The driver 32 drives the actuator based on control performed by the controller 31.

The moving unit 33 of the robot 30 moves in accordance with movement data transmitted from the image display device 10. Therefore, the robot 30 moves so as to follow the user's movement.

The camera 35 is attached to a head 30H (see FIG. 2A or FIG. 2B) of the robot 30, for example. The camera 35 captures a range of a predetermined angle around the robot 30. The camera 35 may be a stereo camera. A video signal composed of digital data output from the camera 35 is supplied to the video signal processor 36. The video signal processor 36 compression-encodes the video signal and supplies the compression-encoded video data to the controller 31. The network communication unit 34 transmits the video data supplied from the controller 31 to the image display device 10 via the network 20. The network communication unit 34 functions as a transmission unit.

After the network communication unit 14 receives the video data transmitted from the robot 30, the network communication unit 14 supplies the video data to the image display unit 11. The network communication unit 14 functions as a receiving unit. The image display unit 11 displays images based on a decoded video signal obtained by decoding the video data. The user views the images displayed on the image display unit 11.

The robot 30 may encode audio signals collected by means of the microphones 37a to 37d and transmit the encoded audio data to the image display device 10. The microphones 37a to 37d are arranged at 90-degree intervals in line in the circumferential direction of the robot 30, for example. After the image display device 10 receives the audio data, the speaker 13 outputs audio based on the decoded audio signal obtained by decoding the audio data by means of an audio decoder (not shown).

In the remote control system in which the image display device 10 and the robot 30 are connected via the network 20, the image display device 10 (the user) controls the robot 30 in real time. The robot 30 moves in accordance with movement data indicating the user's movement. The image display device 10 receives the video captured by the robot 30 or the sound collected by the robot 30 in addition to the video.

To prevent the robot 30 from failing due to some kind of object hitting the robot 30, the robot 30 is configured to take a risk-avoidance action itself, for example. The robot 30 has the ranging sensors 38a to 38d. The ranging sensors 38a to 38d are arranged at 90-degree intervals in line in the circumferential direction of the robot 30, for example. The controller 31 detects whether there is an object approaching the robot 30 and the approaching direction based on the sound collected by means of the microphones 37a to 37d and the distance between the robot and the object measured by means of the ranging sensors 38a to 38d. The controller 31 determines that an object is approaching based on the detected results.

The controller 31 may detect whether there is an object approaching the robot 30 and the approaching direction based only on the distance between the robot and the object measured by means of the ranging sensors 38a to 38d.

Figure 2A:
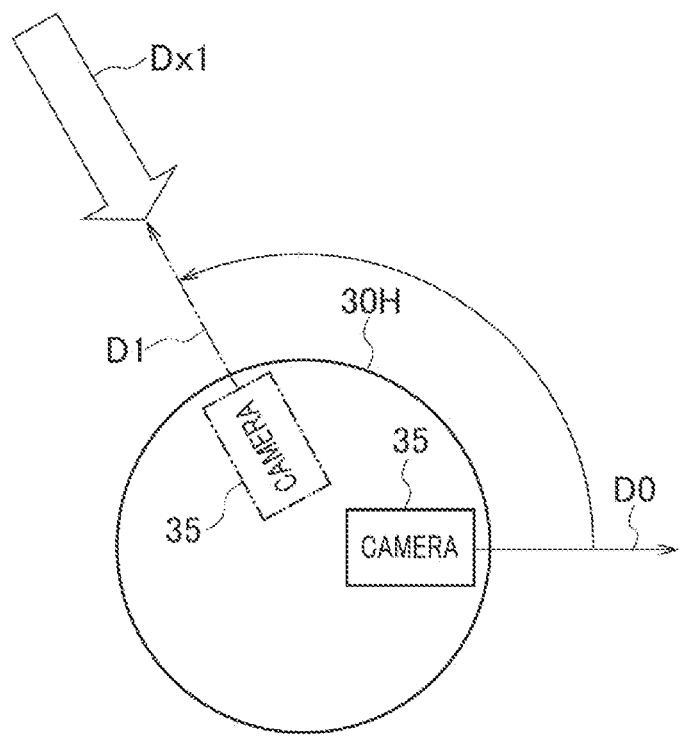
FIG. 2A is a diagram obtained by looking down on a robot from directly above and is a diagram illustrating the rotation of a head 30H of the robot from direction DO to direction D1.

As shown in FIG. 2A, the head 30H of the robot 30 is oriented such that the center of the imaging range of the camera 35 is aligned with the direction D0. Assume that the controller 31 determines that the object is approaching from the direction Dx1, which is a blind spot of the camera 35. The direction in which the object approaches at this time is another direction different from the direction in which the camera 35 captures video. At this time, the controller 31 controls the driver 32 to rotate the head 30H such that the center of the imaging range of the camera 35 is aligned with the direction D1 in order to check the object. After the camera 35 captures the object, the user can control the robot 30 to drive the legs of the robot 30 so that the robot 30 can take a risk-avoidance action. In addition, the controller 31 may control the driver 32 to drive the legs so that the robot 30 itself takes a risk-avoidance action.

Figure 2B:
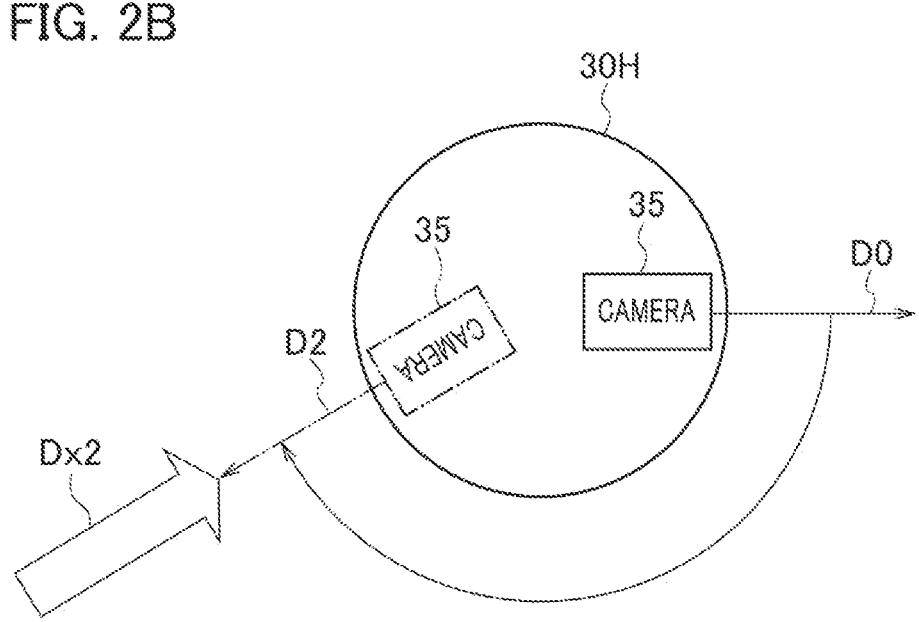
FIG. 2B is a diagram obtained by looking down on a robot from directly above and is a diagram illustrating the rotation of a head 30H of the robot from direction DO to direction D2.

FIG. 2B shows the case where the controller 31 detects the approach of an object from the direction Dx2, which is a blind spot of the camera 35 and is approximately behind the direction D0. The direction in which the object approaches at this time is another direction different from the direction in which the camera 35 captures video. In this case also, the controller 31 controls the driver 32 to rotate the head 30H such that the center of the imaging range of the camera 35 is aligned with the direction D2 in order to check the object.

Suppose that the robot 30 itself rotates its head 30H in order to take a risk-avoidance action. In the above case, the video signal (the video data) transmitted to the image display device 10 moves rapidly regardless of the user's intention even when the user is stationary. Accordingly, the user may experience visually induced motion sickness and confusion. Therefore, the image display device 10 and the robot 30 are configured as in the following first or second embodiment.

First Embodiment

Figure 3:
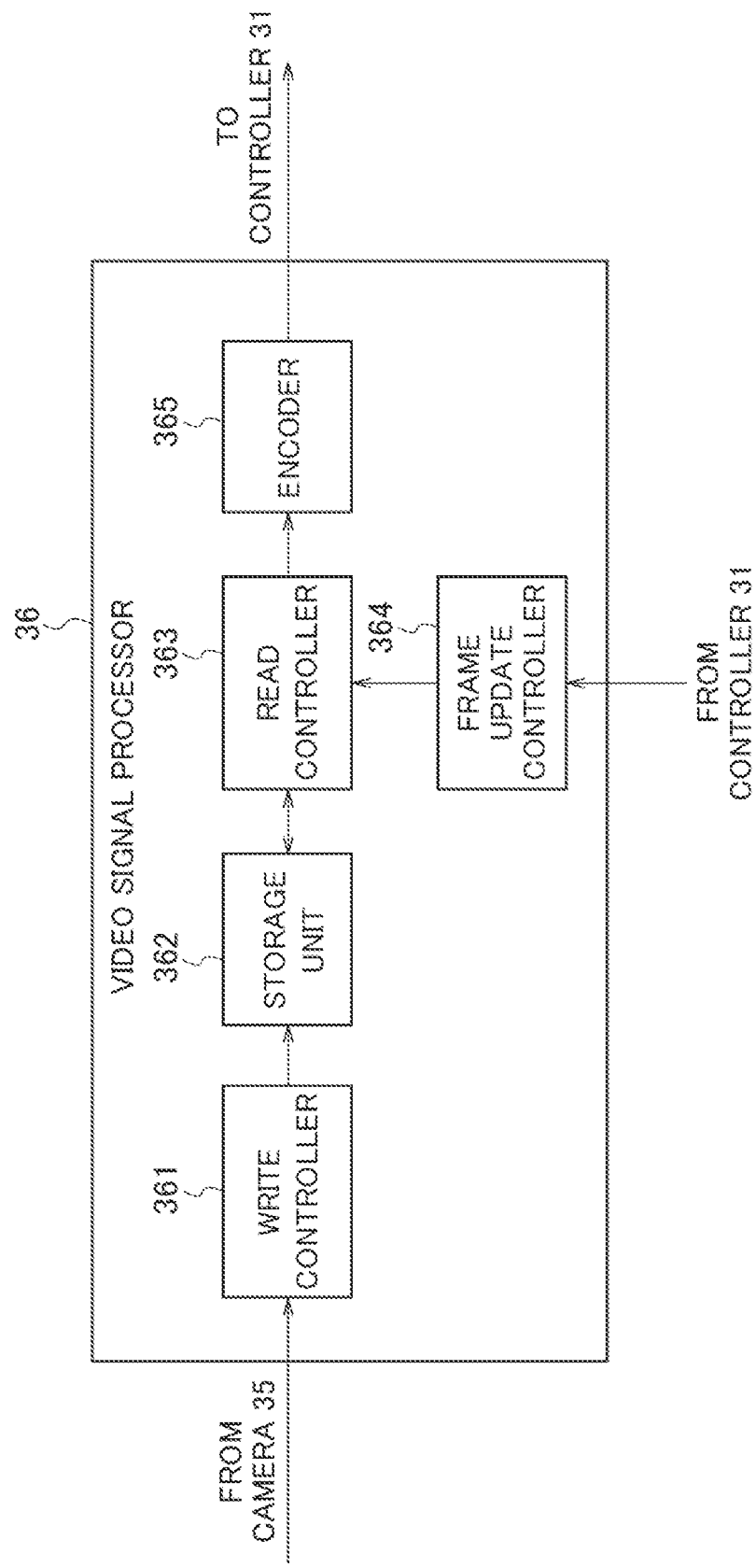
FIG. 3 is a block diagram illustrating a specific configuration example of a video signal processor of a remote controlled device according to a first embodiment.

In a first embodiment, the video signal processor 36 in the robot 30 is configured as follows in order to mitigate the visually induced motion sickness and confusion experienced by the user. As shown in FIG. 3, the video signal processor 36 includes a write controller 361, a storage unit 362, a read controller 363, a frame update controller 364, and an encoder 365.

The write controller 361 writes the video signal of 60 frames per second output from the camera 35 into the storage unit 362, for example. In a state in which the robot 30 moves to follow the user's movement, the frame update controller 364 controls the read controller 363 such that the video signal stored in the storage unit 362 is read at 60 frames per second. Therefore, the read controller 363 reads the video signal stored in the storage unit 362 at 60 frames per second. The encoder 365 compression-encodes the read video signal of 60 frames per second and supplies the compression-encoded video data to the controller 31.

At this time, the frame video update rate of the video signal of 60 frames per second transmitted to the image display device 10 is a first rate. Frame videos are videos in units of frames.

The controller 31 controls the driver 32 such that the robot 30 itself rotates the head 30H as shown in FIG. 2A or FIG. 2B in order to take a risk-avoidance action. At this time, the frame update controller 364 controls the read controller 363 to read the video signal stored in the storage unit 362 at a rate lower than 60 frames per second. The frame update controller 364 controls the read controller 363 to read the video signal stored in the storage unit 362 at a rate corresponding to 20 frames per second. The encoder 365 compression-encodes the read video signal having a rate corresponding to 20 frames per second and supplies the compression-encoded video data to the controller 31.

At this time, the frame video update rate of the video signal transmitted to the image display device 10 is a second rate which is lower than the first rate. A video signal of the second rate is generated based on the video signal of the first rate.

The controller 31 can obtain the time required for rotating the head 30H such that the center of the imaging range of the camera 35 is aligned with the direction D1 or D2. Therefore, the controller 31 instructs the frame update controller 364 to read the signal at a rate lower than 60 frames per second during the time from the start of rotation of the head 30H until the center of the imaging range of the camera 35 is aligned with the direction D1 or D2.

(a) of FIG. 4 shows frame videos F1, F2, F3, F4 and so forth of 60 frames per second input to the video signal processor 36. The frame update controller 364 controls the read controller 363 to update a frame video read out once every three frames out of the frame videos stored in the storage unit 362. As a result, as shown in (b) of FIG. 4, the frame video update rate is 20 frames per second, as in the case of frame videos F1, F1, F1, F4, F4, F4, F7, and so forth. The compression-encoded video data of substantially 20 frames per second is output from the video signal processor 36.

Strictly speaking, the video data shown in (b) of FIG. 4 is a video signal of 60 frames per second. However, since the frame video update rate is 20 frames per second, the video signal seemingly corresponds to a video signal of 20 frames per second. Since video data having a rate corresponding to 20 frames per second is transmitted to the image display device 10, the video does not move rapidly and it is possible to reduce the visually induced motion sickness and confusion experienced by the user.

In (b) of FIG. 4, the frame update controller 364 controls the reading of the frame videos from the storage unit 362 and reduces the frame video update rate. As shown in (c) of FIG. 4, the video signal processor 36 may actually control the frame rate to be 20 frames per second. It is also possible to set the rate at which the frame videos read from the storage unit 362 are updated to 20 frames per second by reducing the frame videos to be written in the storage unit 362.

In FIG. 2B, the angle at which the head 30H is rotated is larger than that in FIG. 2A. The controller 31 may increase the rotation speed as the angle at which the head 30H is rotated increases. Correspondingly, the controller 31 may lower the rate at which the frame videos are updated as the rotation speed increases.

(a) of FIG. 5 shows frame videos F1, F2, F3, F4 and so forth of 60 frames per second output by the video signal processor 36. (b) of FIG. 5 shows the frame video update rate when the angle at which the head 30H is rotated is relatively small as shown in FIG. 2A and the rotation speed is relatively slow. As in (b) of FIG. 4, the frame video update rate is 20 frames per second.

(c) of FIG. 5 shows the frame video update rate when the angle at which the head 30H is rotated is large as shown in FIG. 2B and the rotation speed is high. In (c) of FIG. 5, the frame video update rate is set to be 10 frames per second. Even if the head 30H is rotated rapidly by means of the controller 31, video data having a rate corresponding to 10 frames per second is transmitted to the image display device 10. Therefore, the video does not move rapidly and it is possible to reduce the visually induced motion sickness and confusion experienced by the user.

The controller 31 may gradually increase the frame video update rate immediately before stopping the rotation of the head 30H, and gradually return the rate to 60 frames per second.

Second Embodiment

In a second embodiment, the video signal processor 36 in the robot 30 and the image display unit 11 in the image display device 10 are configured as follows in order to reduce the visually induced motion sickness and confusion experienced by the user.

Figure 6:
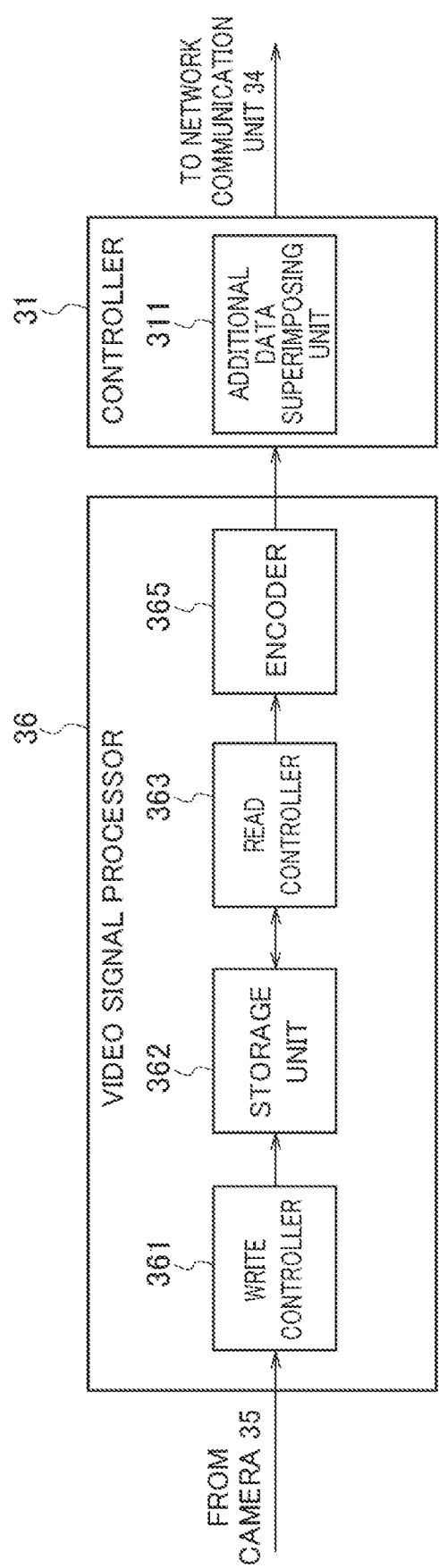
FIG. 6 is a block diagram illustrating a specific configuration example of a video signal processor and a controller of a remote controlled device according to a second embodiment.

As shown in FIG. 6, the video signal processor 36 includes the write controller 361, the storage unit 362, the read controller 363, and the encoder 365. The controller 31 includes an additional data superimposing unit 311 that superimposes additional data on the compression-encoded video data output from the encoder 365. The rate of video data output from the video signal processor 36 is 60 frames per second. When the controller 31 causes the robot 30 itself to rotate the head 30H in order to take a risk-avoidance action, the additional data superimposing unit 311 superimposes additional data on the video data, the additional data being for identifying the start and end of the period during which the head 30H is rotated.

The additional data may include additional data indicating the timing of the start of the period during which the head 30H is rotated and additional data indicating the timing of the end of the period. Further, the additional data may include additional data indicating the timing of the start of the period during which the head 30H is rotated and additional data indicating the time during which the head is rotated. Suppose that the controller 31 increases the rotation speed as the angle at which the head 30H is rotated increases. In the above case, the additional data may include additional data indicating at least two levels of rotation speed.

In this way, when the robot 30 itself rotates the head 30H in order to take a risk-avoidance action, the robot 30 transmits video data on which additional data is superimposed to the image display device 10.

Figure 7:
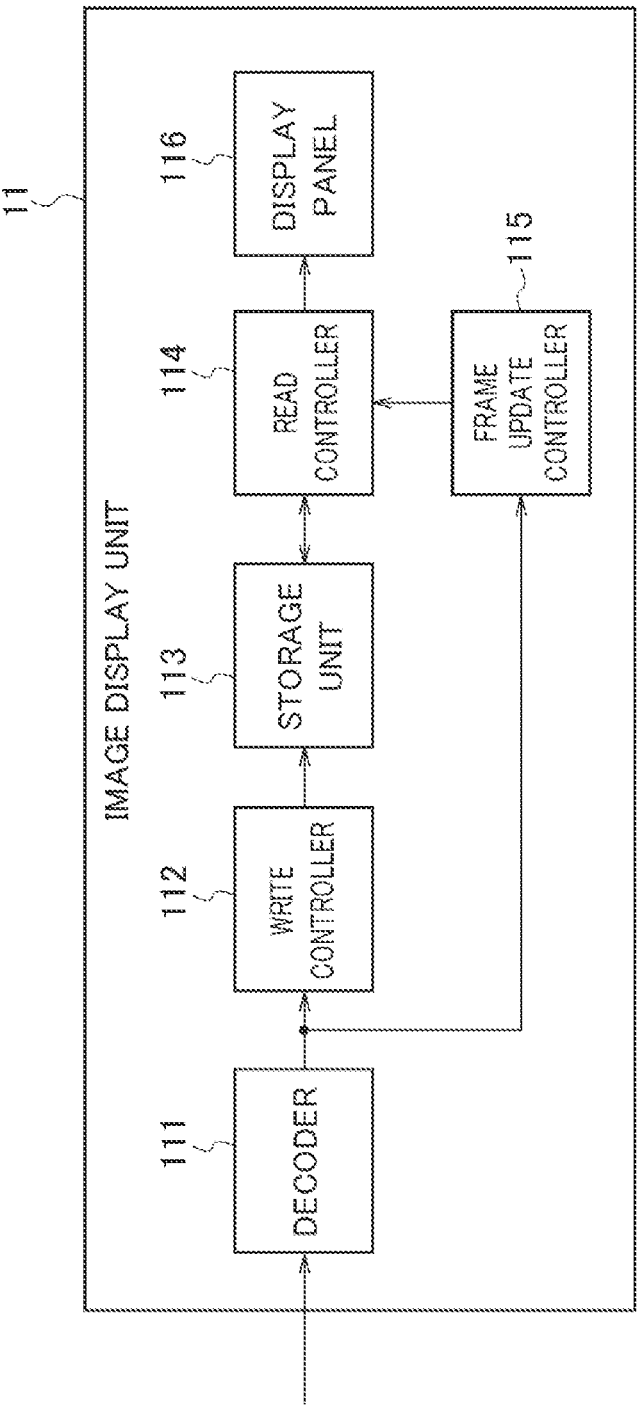
FIG. 7 is a block diagram illustrating a specific configuration example of an image display unit of an image display device according to a second embodiment.

As shown in FIG. 7, the image display unit 11 includes a decoder 111, a write controller 112, a storage unit 113, a read controller 114, a frame update controller 115, and a display panel 116. The decoder 111 decodes the video data transmitted from the robot 30. The write controller 112 writes the decoded video signal of 60 frames per second into the storage unit 113. Decoded additional data is input to the frame update controller 115.

If no additional data is input to the frame update controller 115, the frame update controller 115 controls the read controller 114 to read the video signal stored in the storage unit 113 at 60 frames per second. In the video signal of 60 frames per second supplied to the display panel 116, the frame video update rate is the first rate.

If additional data is input to the frame update controller 115, the frame update controller 115 controls the read controller 114 to read the video signal stored in the storage unit 113 such that the frame video update rate becomes lower than 60 frames per second from the start to the end of the period during which the head 30H is rotated.

As in a first embodiment, the frame update controller 115 controls the read controller 114 to update a frame video read out once every three frames out of the frame videos stored in the storage unit 113. As a result, the rate at which the frame videos of the video signal displayed on the display panel 116 are updated is 20 frames per second, as in the case of the frame videos F1, F1, F1, F4, F4, F4, F7 and so forth as in (b) of FIG. 4.

The rate at which the frame videos of the video signal supplied to the display panel 116 are updated is the second rate which is lower than the first rate. The video signal of the second rate is generated based on the video signal of the first rate.

Suppose that the additional data includes information indicating the level of the rotation speed. In the above case, the frame update controller 115 may control the read controller 114 such that the frame video update rate decreases as the rotation speed increases.

In a second embodiment, the robot 30 transmits video data of 60 frames per second to the image display device 10. Suppose that the robot 30 itself rotates the head 30H in order to take a risk-avoidance action. In the above case, the display panel 116 of the image display device 10 displays a video signal in which the frame video update rate is 20 frames per second or 10 frames per second. Accordingly, in a second embodiment also, the video does not move rapidly and it is possible to reduce the visually induced motion sickness and confusion experienced by the user.

In a second embodiment also, it is preferable to gradually increase the frame video update rate immediately before stopping the rotation of the head 30H, and to gradually return the rate to 60 frames per second.

When the user moves his or her face up and down to move the line of sight up and down, instead of updating the rate of the frame videos, the image display unit 11 may display images as follows. The image display unit 11 cuts out an overlapping area in the up-and-down direction between the image before moving and the image after moving, and displays images without blurring in the up-down direction by enlarging the images as needed.

Third Embodiment

In order to reduce the visually induced motion sickness and confusion experienced by the user, the robot 30 may be configured as follows. When the controller 31 controls the driver 32 so as to move the moving unit 33 in accordance with the movement data, the controller 31 controls the video signal processor 36 to generate frame videos having a first resolution, which is the normal resolution. When the controller 31 controls the driver 32 so as to move the moving unit 33 regardless of the movement data, the controller 31 controls the video signal processor 36 to generate frame videos having a second resolution which is lower than the first resolution. In order to make the frame videos having the first resolution into the frame videos having the second resolution, it is sufficient if the video signal processor 36 reduces the number of pixels in the horizontal direction and reduces the number of lines in the vertical direction.

Fourth Embodiment

In order to reduce the visually induced motion sickness and confusion experienced by the user, the image display device 10 may be configured as follows. If no additional data is input, the image display unit 11 displays the video signal received by the network communication unit 14 as frame videos having the first resolution. If additional data is input, the image display unit 11 displays the video signal received by the network communication unit 14 as frame videos having the second resolution. The image display unit 11 may reduce the number of pixels in the horizontal direction and reduce the number of lines in the vertical direction in order to make the frame videos having the first resolution into the frame videos having the second resolution.

Fifth Embodiment

In order to reduce the visually induced motion sickness and confusion experienced by the user, the robot 30 may be configured as follows. When the controller 31 controls the driver 32 to move the moving unit 33 in accordance with the movement data, the controller 31 controls the video signal processor 36 to generate normal frame videos on which blurring processing is not performed. When the controller 31 controls the driver 32 to move the moving unit 33 regardless of the movement data, the controller 31 controls the video signal processor 36 to generate blurred frame videos obtained by performing the blurring processing on the frame videos. The video signal processor 36 removes the high-frequency component of the frame videos by means of a low-pass filter in order to perform the blurring processing on the frame videos, for example. There are no restrictions on how the blurring processing is performed.

Sixth Embodiment

In order to reduce the visually induced motion sickness and confusion experienced by the user, the image display device 10 may be configured as follows. When no additional data is input, the image display unit 11 displays a video signal, on which the blurring processing is not performed, received by the network communication unit 14 as frame videos without any changes. When additional data is input, the image display unit 11 performs the blurring processing on the video signal received by the network communication unit 14 and displays the signal as blurred frame videos. The image display unit 11 removes the high-frequency component of the video signal received by the network communication unit 14 by means of a low-pass filter, for example. There are no restrictions on how the blurring processing is performed.

As described above, when the controller 31 of the robot 30 controls the driver 32 so as to move the moving unit 33 in accordance with the movement data, the controller 31 generates video data formed of frame videos having a first display mode. When the controller 31 controls the driver 32 so as to move the moving unit 33 regardless of the movement data, the controller 31 generates video data formed of frame videos having a second display mode different from the first display mode. If no additional data is input, the image display unit 11 of the image display device 10 displays the frame videos having the first display mode. If additional data is input, the image display unit 11 displays the frame videos having the second display mode different from the first display mode.

The frame videos having the second display mode are frame videos that give less stimulus to the user than the frame videos having the first display mode. As described above, the first display mode may differ from the second display mode in terms of the frame rate, the resolution, and whether the blurring processing is performed. Any combination of the frame rate change, the resolution change, and whether the blurring processing is performed may be used.

In accordance with a remote controlled device, an image display device, and a video display control method according to one or more embodiments, in a remote control system including the remote controlled device and the image display device, which displays a video signal transmitted from the remote controlled device, it is possible to reduce the visually induced motion sickness and confusion experienced by the user even if the remote controlled device moves regardless of the user's intention.

The present invention is not limited to first to sixth embodiments described above, and various modifications are possible within a scope not departing from the scope of the present invention.

What is claimed is:

1. A remote controlled device comprising:
a moving unit;
a driver configured to drive the moving unit;
a network communication unit configured to receive movement data indicating a movement of a user via a network and to transmit video data to an image display device worn by the user;
a controller configured to control the driver so as to move the moving unit in accordance with the movement data of the user;
a camera attached to the moving unit;
a video signal processor configured to generate the video data based on a video signal captured by the camera, and
a plurality of ranging sensors arranged in line in a circumferential direction of the remote controlled device and configured to measure a distance between the remote controlled device and another object, wherein
the controller is configured:
to detect whether there is an object approaching the remote controlled device and an approaching direction based on a distance between the remote controlled device and the object by means of the plurality of ranging sensors in order for the remote controlled device to take a risk-avoidance action,
to control the driver so as to move the moving unit in accordance with the movement data of the user and to control the video signal processor to generate video data formed of a frame video having a first display mode, when the controller determines that the risk-avoidance action needs not to be taken, and
to control the driver so as to move the moving unit to take the risk-avoidance action, not in accordance with the movement data of the user, and to control the video signal processor to generate video data formed of a frame video having a second display mode, when the controller determines that the risk-avoidance action needs to be taken.

2. The remote controlled device according to claim 1, wherein
the controller is configured to control the video signal processor to generate video data formed of a frame video that is updated at a first rate, as the frame video having the first display mode, and video data formed of a frame video that is updated at a second rate lower than the first rate, as the frame video having the second display mode.

3. The remote controlled device according to claim 1, wherein
the controller is configured to control the video signal processor to generate video data formed of a frame video having a first resolution, as the frame video having the first display mode, and video data formed of a frame video having a second resolution lower than the first resolution, as the frame video having the second display mode.

4. The remote controlled device according to claim 1, wherein
the controller is configured to control the video signal processor to generate video data formed of a frame video on which blurring processing is not performed, as the frame video having the first display mode, and video data formed of a frame video on which blurring processing is performed, as the frame video having the second display mode.

5. The remote controlled device according to claim 1, wherein
when the controller determines that the object is approaching the remote controlled device from another direction different from a direction in which the camera is capturing images, based on the distance measured by means of the plurality of ranging sensors, the controller is configured to control the driver so as to move the moving unit to take the risk-avoidance action, not in accordance with the movement data of the user.

6. The remote controlled device according to claim 2, wherein
the video signal processor comprises:
a storage unit configured to store the video signal that has the first rate and is captured by the camera;
a read controller configured to read the video signal from the storage unit; and
a frame update controller configured to control the read controller to set a rate at which a frame video is updated, to the second rate when the controller controls the driver so as to move the moving unit regardless of the movement of the user.

7. An image display device comprising:
a movement sensor configured to detect a movement of a user;
a receiving unit configured to receive a video signal and additional data, the video signal being captured by a camera attached to a moving unit of a remote controlled device configured to move in accordance with movement data indicating the movement of the user detected by the movement sensor, and the additional data being for identifying a start and an end of a period during which the moving unit is rotated; and
an image display screen configured to display the video signal received by the receiving unit, wherein
the additional data is superimposed on the video signal when the remote controlled device moves the moving unit to take a risk-avoidance action, not in accordance with the movement data of the user, and
when the additional data is not input, the image display screen displays the video signal received by the receiving unit as a frame video having a first display mode, and when the additional data is input, the image display screen displays the video signal received by the receiving unit as a frame video having a second display mode.

8. The image display device according to claim 7, wherein
the image display screen displays a frame video that is updated at a first rate as the frame video having the first display mode, and displays a frame video that is updated at a second rate lower than the first rate as the frame video having the second display mode.

9. The image display device according to claim 7, wherein
the image display screen displays a frame video having a first resolution as the frame video having the first display mode, and displays a frame video having a second resolution lower than the first resolution as the frame video having the second display mode.

10. The image display device according to claim 7, wherein
the image display screen displays a frame video to which blurring processing is not performed as the frame video having the first display mode, and displays a frame video to which blurring processing is performed as the frame video having the second display mode.

11. The image display device according to claim 8, wherein
the image display screen comprises:
a storage unit configured to store the video signal that has the first rate and is received by the receiving unit;
a read controller configured to read the video signal from the storage unit; and
a frame update controller configured to control the read controller to set a rate at which a frame video is updated, to the second rate when the remote controlled device moves the moving unit regardless of the movement of the user.

12. A video display control method comprising:
transmitting movement data indicating a movement of a user to a remote controlled device;
moving a moving unit in accordance with the received movement data by means of the remote controlled device;
transmitting a video signal captured by a camera attached to the moving unit to an image display device worn by the user by means of the remote controlled device;
displaying the video signal transmitted from the remote controlled device by means of an image display screen of the image display device;
detecting whether there is an object approaching the remote controlled device and an approaching direction based a distance between the remote controlled device and the object by means of the remote controlled device in order for the remote controlled device to take a risk-avoidance action;
transmitting a video signal formed of a frame video having a first display mode to the image display device by means of the remote controlled device, and displaying the video signal formed of the frame video having the first display mode by means of the image display screen, when a controller of the remote controlled device moves the moving unit in accordance with the movement data of the user, in a case where the risk-avoidance action needs not to be taken; and
transmitting a video signal formed of a frame video having a second display mode different from the first display mode, to the image display device by means of the remote controlled device, and displaying the video signal formed of the frame video having the second display mode by means of the image display screen, or transmitting a video signal formed of a frame video having the first display mode, to the image display device by means of the remote controlled device, and displaying a video signal formed of a frame video having the second display mode based on the frame video having the first display mode by means of the image display screen, when the controller of the remote controlled device moves the moving unit to take the risk-avoidance action, not in accordance with the movement data of the user, in a case where the risk-avoidance action needs to be taken.

* * * * *